(12) United States Patent
Foster et al.

(10) Patent No.: US 7,707,594 B1
(45) Date of Patent: Apr. 27, 2010

(54) SYSTEM AND METHOD FOR PROVIDING A ROUTING SERVICE IN DISTRIBUTED COMPUTING ENVIRONMENT

(75) Inventors: David B. Foster, Pinson, AL (US); Larry K. Holden, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1508 days.

(21) Appl. No.: 10/223,359

(22) Filed: Aug. 20, 2002

(51) Int. Cl.
*G06F 13/00* (2006.01)

(52) U.S. Cl. ............... 719/330; 709/201; 709/203; 709/219; 709/238

(58) Field of Classification Search ............... 709/328, 709/242, 243, 238, 201, 203, 219; 719/330
See application file for complete search history.

(56) References Cited

U.S. PATENT DOCUMENTS

| | | | | |
|---|---|---|---|---|
| 6,052,718 | A * | 4/2000 | Gifford | 709/219 |
| 6,130,875 | A * | 10/2000 | Doshi et al. | 370/225 |
| 6,216,173 | B1 * | 4/2001 | Jones et al. | 715/705 |
| 6,505,254 | B1 * | 1/2003 | Johnson et al. | 709/239 |
| 6,718,550 | B1 | 4/2004 | Lim et al. | |
| 6,970,902 | B1 * | 11/2005 | Moon | 709/201 |
| 6,976,261 | B2 | 12/2005 | Callsen et al. | |
| 7,055,028 | B2 | 5/2006 | Peiffer et al. | |
| 7,290,056 | B1 | 10/2007 | McLaughlin, Jr. | |
| 2003/0120817 | A1 * | 6/2003 | Ott et al. | 709/249 |
| 2005/0144267 | A1 | 6/2005 | Maron | |

OTHER PUBLICATIONS

Morgan, Bryan. "CORBA meets Java." JavaWorld, <http://www.javaworld.com/javaworld/jw-10-1997/jw-10-corbajava_p.html>, Oct. 1997; retrieved Apr. 14, 2006.*
Garg, Rohit. "Enterprise JavaBeans™ to CORBA Mapping." Version 1.0, Sun Microsystems; Mar. 23, 1998.*
Krumel, Andy. "Locating CORBA objects using Java IDL." JavaWorld, <http://www.javaworld.com/javaworld/jw-02-1999/jw-02-enterprise_p.html>, Feb. 1999; retrieved Apr. 14, 2006.*
Brown, Kyle, Lee Cook. "What's it going to take to get you to go with EJB components?" IBM, <http://www-128.ibm.com/developerworks/ibm/library/ibm-ejb/>, May 4, 2000; retrieved Apr. 18, 2006.*

(Continued)

*Primary Examiner*—Andy Ho
(74) *Attorney, Agent, or Firm*—Parks IP Law LLC; Jennifer Pearson Medlin

(57) ABSTRACT

A system for providing a routing service that enables a client to locate a target service in distributed computing environment that supports multiple communications protocols. The system includes a main database and a routing mechanism. The main database has routing information. The routing mechanism can be distributed in multiple instances. The routing mechanism includes a local database. The local database stores an extract of the main database. The routing mechanism uses the local database to make routing decisions. To locate the target service, the client first obtains a reference to the routing mechanism. The client then sends a request with input parameters to the routing mechanism. The routing mechanism then returns output parameters to the client. The output parameters contains a reference and/or associated properties of the target service depending on the type of the target service. The client analyzes the returned output parameters and locates the target service.

29 Claims, 4 Drawing Sheets

OTHER PUBLICATIONS

Goetz, Brian. "J2EE or J2SE? JNDI works with both." JavaWorld, <http://www.javaworld.com/javaworld/jw-04-2002/jw-0419-jndi_p.html>, Apr. 2002; retrieved Apr. 14, 2006.*

Tanenbaum, Andrew S. "Computer Networks." Third Edition, Prentice Hall PTR, 1996; pp. 144-155.*

"The Common Object Request Broker: Architecture and Specification." Revision 2.0, Jul. 1995, Updated Jul. 1996; chapter 1-3, 7, Appendix D.*

T. Koch and S. Murer, "Service Architecture Integrates Mainframes in a CORBA Environment," Sep. 27-30, 1999.

* cited by examiner

Known Art

SYSTEM AND METHOD FOR PROVIDING A ROUTING SERVICE IN DISTRIBUTED COMPUTING ENVIRONMENT

BACKGROUND

1. Field of the Invention

The present invention relates generally to a communications infrastructure, and more particularly to a system and method for providing a routing service that enables distributed applications (clients) to locate service provider application (target services) in distributed computing environment.

2. Background of the Invention

A common characteristic of large enterprise applications is a horizontal data distribution in multiple instances of one application. For example, a telephone service provider may have a single customer record inquiry system that runs in each of its multiple mainframe regions. Each mainframe region has databases that contain information regarding a portion of the customers of the telephone service provider. For example, the Alabama mainframe region maintains databases regarding customers in Alabama; and the Georgia mainframe region, customers in Georgia. To obtain the information associated with a particular customer, a client or a distributed application that is requesting the information determines which mainframe region the information is located based on the NPA/NXX portion of the customer's telephone number. Thereafter, the distributed application communicates with the customer record inquiry system (the target) running on the mainframe for that region to obtain the information.

To provide interoperability between applications that may be written in different languages and/or run on different platforms in distributed computing environment, custom-programmed middleware solutions have been developed. Exemplary middleware solutions include distributed object systems such as CORBA (Common Object Request Broker Architecture), DCOM (Distributed Component Object Model), and EJB (Enterprise Java Beans). Among these solutions, CORBA has been the most popular packaged middleware solution because it supports detail transparency and interface standardization.

CORBA is OMG's (Object Management Group's) open, vendor-independent specification for an architecture and infrastructure that computer applications use to work together over networks. CORBA is designed to provide interoperability between applications that may be written in different languages and may run on different platforms. CORBA defines an implementation independent object model, which is built with a programming language, such as C++ or Java. CORBA provides object services that are domain-independent interfaces that are used by many distributed object programs.

CORBA defines an ORB (Object Request Broker) that handles the transport of information between applications. The ORB functions as a communications infrastructure, transparently relaying object requests across distributed heterogeneous computing environments. ORB simplifies distributed programming by decoupling the client from the details of the method invocations. Interoperability is accomplished through well-defined object interface specifications, which allow client applications to connect to the ORB, specified in OMG IDL (Interface Definition Language). OMG IDL defines the types of objects according to the operations that may be performed on them and the parameters to those operations.

FIG. 1 shows the basic CORBA ORB architecture. Client 100 is the entity that wishes to perform an operation on an object. The object, which is known as a "servant" and implemented by a server, is an entity that consists of an identity, an interface and an implementation. Object implementation 102 is a code and data that actually implements the object. Object implementation 102 provides the semantics of the object, usually by defining data for the object instance and code for the object's method. The objects export object references with interfaces specified by the OMG IDL for use by clients. The object reference contains an identification of the object implementation so that the object adapter can pass the client's request to the correct object in the server. The CORBA architecture is implemented in a conventional programming language, such as C, C++, Java, or Smalltalk.

To use CORBA, OMG IDL specification is written and compiled to generate client stubs and server skeletons in the languages in which client and server are written. The stubs and skeletons serve as proxies for clients and servers, respectively. The stubs and skeletons are then included in the client's program and the server's program, respectively. Thereafter, Client 100 initiates a request to an operation on object implementation 102 through IDL stub 106. The request is an event carrying information that includes an operation, an object reference of the service provider, and actual parameter. IDL stub 106 represents the mapping between the language of implementation of client 100 and ORB 104. IDL skeleton 110 represents the mapping between the language of implementation of object implementation 102 and ORB 104. ORB 104 locates the appropriate implementation code, transmits parameters and transfers control to object implementation 102 through IDL skeleton 110. In performing the request, the object implementation may obtain some services from ORB 104 through object adapter 112. When the request is complete, control and output values are returned to client 100.

One of many challenges in CORBA is to provide a high-level of management for the very large amount of underlying distributed objects. Most of the CORBA systems fail to provide better performance when dealing with large scale distributed application.

SUMMARY OF THE INVENTION

The present invention provides methods, systems, and computer program products for providing a routing service in distributed computing environment. The present invention provides a communications infrastructure that enables distributed applications (clients) to locate horizontally distributed service provider applications (targets). The routing service of the present invention can support a large number of routing rules and can be used in large scale distributed computing environment. The service provider applications may be using any middleware tool, such as Orbix, MQSeries, BusinessWare, BEA WebLogic and CONNECT:Direct. Orbix is a registered trademark of IONA Technologies, Inc., MQSeries is a registered trademark of International Business Machines Corporation, BusinessWare is a registered trademark of Vitria Technology, Inc., BEA WebLogic is a registered trademark of BEA Systems, Inc., and CONNECT:Direct is a registered trademark of Sterling Commerce, Inc. For flexibility across the different tool interaction styles, the routing service can be provided as a CORBA service (CORBA is a registered trademark of Object Management Group, Inc.). This enables access to the service provider applications from many platforms and languages. Answers provided by the routing service of the present invention is flexible such that the information returned could be a CORBA service name, an MQSeries Queue, a BusinessWare channel name, a hostname, or any other locator information needed to meet the routing needs.

One embodiment of the present invention is a system that provides a routing service. The routing service enables a client to locate a target service in distributed computing environment that supports multiple communications protocols. The system includes a main database that contains routing information and a routing mechanism that provides the routing service. The routing mechanism has a local database, an interface, and a routing table. The local database stores an extract of the main database. The interface receives input parameters from the client and performs a rules-based search of the local database. The local database provides identifiers of the target service. The routing table provides additional properties of the target service. The interface is defined in IDL. The routing mechanism uses the content of the local database to make routing decisions. The routing mechanism can be distributed in multiple instances. The multiple instances of the routing mechanism can run simultaneously. The routing mechanism can be co-located with the client. Alternatively, the routing mechanism can be a separate unit or remote to the client.

The client obtains and compiles a first IDL for the routing mechanism and a second IDL for the target service. The first and second IDLs are used to obtain stubs for communication with the routing mechanism and the target service, respectively. Then, the client obtains a reference to the routing mechanism and sends a request to the routing mechanism to locate the target service. The client calls the interface of the routing mechanism and provides input parameters. The input parameters may include policy, interface type, version, mode, input data, and desired properties of the target service. The interface searches the local database. The local database provides the identifiers of the target service. The routing table provides additional properties of the target service to the identifiers provided by the local database. The interface then returns a sequence of output parameters to the client. Each output parameters contains a reference and/or associated properties of the target service depending on the type of the target service. Finally, the client analyzes the returned output parameters and locates the target service.

DETAILED DESCRIPTION OF THE INVENTION

The present invention provides a routing service that can be used in large scale distributed computing environment that requires complex routing capabilities. The present invention provides a communications framework that enables distributed applications to locate horizontally distributed service provider application in distributed computing environment. In one embodiment, for flexibility across the different tool interaction styles, the communications framework of the present invention can be provided as a CORBA service. This provides interoperability between applications that are written in different languages and/or run on different platforms. The service provider application may be using any middleware, such as Orbix, MQScries, BusinessWare, BEA WebLogic and CONNECT:Direct. An answer to a request can be provided in any format, such as a CORBA Service Name, an MQSeries Queue, a BusinessWare channel name, a hostname, or any other locator information needed to meet a distributed application's routing needs.

Reference will now be made in detail to the preferred embodiments of the present invention, examples of which are illustrated in the accompanying drawings.

Figure 1:
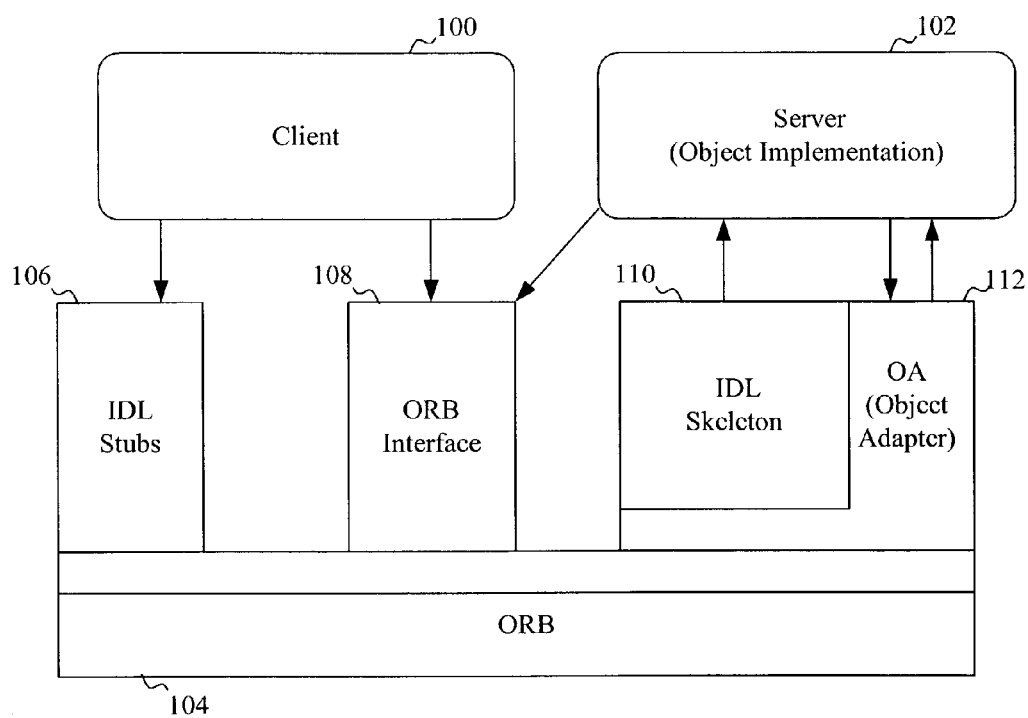
FIG. 1 is a schematic diagram showing a known CORBA ORB architecture.
Figure 2:
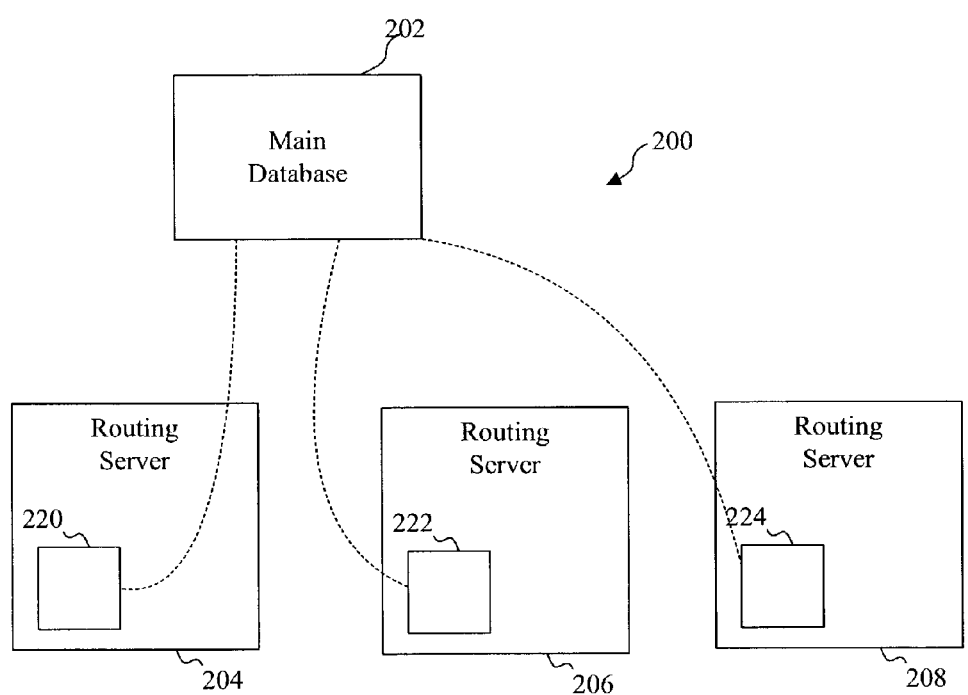
FIG. 2 is a schematic diagram showing a communications framework according to a preferred embodiment of the present invention.

FIG. 2 is a schematic diagram that illustrates, in a very simple fashion, the preferred communications framework of the present invention. As shown, communications framework 200 includes main database 202. Communications framework 200 also includes one or more routing servers 204, 206 and 208 to provide the routing service of the invention. The routing service can be distributed in multiple instances. For example, the routing service can be distributed in multiple instances and provided by routing servers 204, 206 and 208. The multiple instances of the routing service can be run simultaneously. Main database 202 includes routing rules (i.e., routing information). Main database 202 can be updated automatically or manually when the routing rules are changed. Each routing server 204, 206 and 208 includes a local database 220, 222 and 224, respectively. The extract of main database 202 is distributed to the each of the routing servers 204, 205 and 208 and stored in the local databases 220, 222, and 224, respectively. The routing service of the present invention can be integrated into existing CORBA domains without creating a new, additional domain for the use of the routing service.

Figure 3:
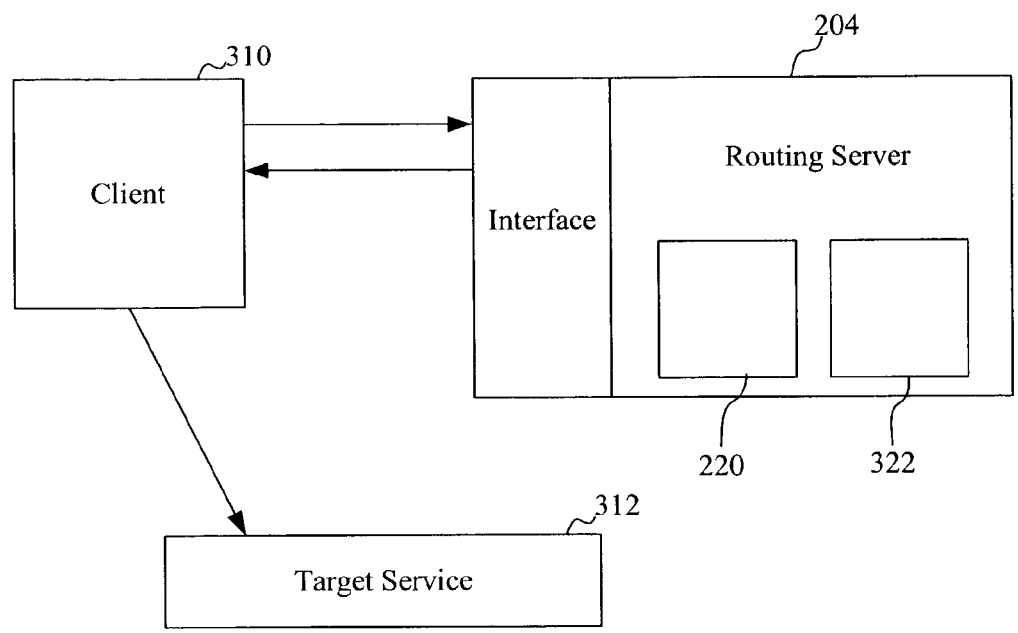
FIG. 3 is a schematic diagram showing distributed computing environment according to a preferred embodiment of the present invention.

FIG. 3 is a schematic diagram that illustrates in a very simple fashion, an exemplary distributed computing environment that includes routing server 204. Routing server 204 may be local or remote to client 310. Client 310 uses the routing service provided by routing server 204 to locate target service 312. Client 310 and target service 312 may be written in any object oriented programming language, such as C++, Java or SmallTalk. The service provider application (i.e., target service 312) may be using any middleware tool, such as CORBA, MQSeries, BusinessWare, BEA WebLogic and CONNECT:Direct. Client 310 can use the routing service of the invention in a manner similar to a known CORBA trader service.

The interfaces of the routing service can be defined in an IDL as follows:

```
module routing
{
    interface Router
    {
        exception NotFoundException { string reason;};
        exception InvalidArgumentException { string reason;};
        exception UnrecognizedPropertyException { string reason;};
        struct Property
        {
            string name;
            string value;
        };
        typedef sequence<Property> PropertySeq;
        struct Offer
        {
            Object reference;
```

-continued

```
        PropertySeq properties;
    };
    typedef sequence<Offer> OfferSeq;
    // query method
    void query(in string policy,
        in PropertySeq desiredProperties,
        out OfferSeq offers)
        raises (NotFoundException,
            InvalidArgumentException,
            UnrecognizedPropertyException);
    };
};
```

To locate target service 312 in distributed computing environment, client 310 calls a query method of the routing service defined in the IDL shown above. The query method receives input parameters and returns an appropriate output according to the type of the target service.

The input parameters of the query method may include, for example, "policy" and "desiredProperties." The first attribute of the query method "policy" is a unique identifying name that associates the target service with the routing rules in local database 220. The second input attribute of the query method "desiredProperties" may be a sequence of property name/value pairs. Some possible types of desiredProperties can include the following:

version: indicates a version of the first attribute 'policy.' This may be an option.

mode: indicates a life cycle context of the target service. The mode provides a direction to the routing. For example, P for a Production server, T for a Test server, D for a Development server, and Q for a Training server can be used. Other values may be used.

data: is an input string used for execution of routing rules. For example, data can be 123456789.

key: indicates a content-based routing key to be used in mapping to a target service. For example, address, site code, state code, or any other content-based routing criteria defined by the client can be used. The routing service may parse the key provided by the client based on a rule specified on the policy to build the true concatenated key to be matched against the routing rules. The key can be extracted from the data and can be used by the routing service to find the routing information. For data 123456789, for example, key can be 123456. The key may be an option.

interface: indicates a type of the target service interface, such as CORBA, IMSraw or EJB. For CORBA services, it may be a name of the interface defined in the IDL. The interface may be an option.

transport: indicates a preference for a particular type of middleware transport. For example, the transport may include QUEUE, CHANNEL, CORBA, HOST, and other values defined by applications. The transport can be used for receiving a server application that presents both an MQSeries interface and a BusinessWare interface for the same functionality. The transport may be an option.

lookup: indicates special lookup rules that can be used. For example, a lookup value "simple" causes the routing service to simply return the target information, such as IID, Service, and Tran, from the local database without filtering.

Exceptions, such as NotFoundException, InvalidArgumentException and UnrecognizedPropertyException, indicate error in using the routing service. For example, NotFoundException indicates that a property, which was inputted to the query method, is not recognized by the routing service.

The output of the query method "Offer" includes a sequence of Offer structures. Each Offer structure contains an Object reference and a sequence of associated properties. Multiple Offers may be returned when there are multiple targets having the capability to satisfy the same interface requirements. If the target is a CORBA service, for example, the Object reference in the Offer structure is a reference to the interface matching the routing criteria, such as a logical name of the CORBA service. If the target is not a CORBA service, the Object reference is nil and the sequence of associated properties may include, for example, string properties, which can represent a queue name (for MQSeries), channel name (for BusinessWare), hostname (for CONNECT:Direct), or any other type of location information.

As shown in FIG. 3, routing server 204 also includes local database 220 and routing table 322. Local database 220 contains the extract of main database 202 which includes the routing information. The local database contains the complex routing rules used to identify the target service. The local database provides identifiers of the target service. The routing service uses local database 220 to make routing decisions. For example, local database 220 may include the following entries: contract for uniquely identifying the row of the local database, version for indicating a version of the contract, mode for indicating the context (i.e. development, test, production, training, etc.), key for indicating low and high values of the data, and IID and service for indicating a name of the target service. Routing table 322 extends the target information received from local database 220. The routing table receives the identifiers of the target service from the local database and provides additional properties of the target service. An exemplary routing table document type definitions is as follows:

<!ELEMENT routingtable (corbapolicy|ejbpolicy|clienttoqueuepolicy|queuetoqueuepolicy)*>

<!ELEMENT corbapolicy (corbamapping)+>

<!ELEMENT ejbpolicy (ejbmapping)+>

<!ELEMENT clienttoqueuepolicy (clienttoqueuemapping)+>

<!ELEMENT queuetoqueuepolicy (queuetoqueuemapping)+>

<!ELEMENT corbamapping (corbaoffer)+>

<!ELEMENT ejbmapping (ejboffer)+>

<!ELEMENT clienttoqueuemapping (clienttoqueueoffer)+>

<!ELEMENT queuetoqueuemapping (queuetoqueueoffer)+>

<!ELEMENT corbaoffer EMPTY>

<!ELEMENT ejboffer EMPTY>

<!ELEMENT clienttoqueueoffer EMPTY>

<!ELEMENT queuetoqueueoffer EMPTY>

<!ATTLIST routingtable version CDATA #REQUIRED>

<!ATTLIST corbapolicy name CDATA #REQUIRED>

<!ATTLIST corbapolicy contract CDATA #REQUIRED>

<!ATTLIST corbamapping iid CDATA #REQUIRED>

<!ATTLIST corbaoffer servicename CDATA #REQUIRED>

<!ATTLIST corbaoffer staleness.aftererror (true|false) "true">

```
<!ATTLIST corbaoffer staleness.afterminutes CDATA
"1440">
<!ATTLIST corbaoffer staleness.afteruses CDATA " ">
<!ATTLIST ejbpolicy name CDATA #REQUIRED>
<!ATTLIST ejbpolicy contract CDATA #REQUIRED>
<!ATTLIST ejbmapping iid CDATA #REQUIRED>
<!ATTLIST ejboffer server_url CDATA #REQUIRED>
<!ATTLIST ejboffer icf CDATA #REQUIRED>
<!ATTLIST ejboffer jndi_name CDATA #REQUIRED>
<!ATTLIST ejboffer staleness.aftererror (true|false) "true">
<!ATTLIST ejboffer staleness.afterminutes CDATA
"1440">
<!ATTLIST ejboffer staleness.afteruses CDATA " ">
<!ATTLIST clienttoqueuepolicy name CDATA
#REQUIRED>
<!ATTLIST clienttoqueuepolicy contract CDATA
#REQUIRED>
<!ATTLIST clienttoqueuemapping iid CDATA
#REQUIRED>
<!ATTLIST clienttoqueueoffer host_ip CDATA
#REQUIRED>
<!ATTLIST clienttoqueueoffer port CDATA #REQUIRED>
<!ATTLIST clienttoqueueoffer q_mgr_name CDATA
#REQUIRED>
<!ATTLIST clienttoqueueoffer channel CDATA
#REQUIRED>
<!ATTLIST clienttoqueueoffer in_q_name CDATA
#REQUIRED>
<!ATTLIST clienttoqueueoffer max_connections CDATA
#REQUIRED>
<!ATTLIST clienttoqueueoffer staleness.aftererror
(true|false) "true">
<!ATTLIST clienttoqueueoffer staleness.afterminutes
CDATA "1440">
<!ATTLIST clienttoqueueoffer staleness.afteruses CDATA "
">
<!ATTLIST queuetoqueuepolicy name CDATA
#REQUIRED>
<!ATTLIST queuetoqueuepolicy contract CDATA
#REQUIRED>
<!ATTLIST queuetoqueuemapping iid CDATA
#REQUIRED>
<!ATTLIST queuetoqueueoffer queue CDATA
#REQUIRED>
<!ATTLIST queuetoqueueoffer staleness.aftererror
(true|false) "true">
<!ATTLIST queuetoqueueoffer staleness.afterminutes
CDATA "1440">
<!ATTLIST queuetoqueueoffer staleness.afteruses CDATA "
">
``` where, name indicates a name of the policy that can be used by the client for routing;

contract provides unique identifier to be used in the local database for the target service;

corbapolicy provides one to one mapping of the policy specified as name in the entry of routing table 322 and contract specified in local database 220 for a CORBA service;

ejbpolicy provides one to one mapping of the policy specified as name in the entry of the routing table and contract specified in the local database for a EJB service;

clienttoqueuepolicy provides one to one mapping of the policy specified as name and contract specified in the local database for an MQSeries queue to be used by the client;

queuetoqueuepolicy provides one to one mapping of the policy specified as name in the entry of the routing table and contract specified in the local database for an MQSeries queue to be used by another MQSeries;

corbamapping relates an IID from the local database to the list of properties required for a CORBA service;

ejbmapping relates an IID from the local database to the list of properties required for a EJB service;

clienttoqueuemapping relates an IID from the local database to the list of properties required for an MQSeries to be used by the client;

queuetoqueuemapping relates an IID from the local database to the list of properties required for an MQSeries used from another MQSeries;

corbaoffer lists the properties to be returned in the sequence of offers for a CORBA service;

ejboffer lists the properties to be returned in the sequence of offers for an EJB service;

clienttoqueueoffer lists the properties to be returned in the sequence of offers for an MQSeries to be used by the client;

queuetoqueueoffer lists the properties to be returned in the sequence of offers for an MQSeries used by another MQSeries; and staleness allows services to limit the lifespan of an offer made to the client. The lifespan of an offer can be limited so that the offer becomes stale after the client encounters an error while interfacing with a service, after a number of minutes or after being used a number of times.

Routing table 322 may be provided in XML (Extensible Markup Language). An exemplary routing table in XML is as follows:

```
<?xml version="1.0" standalone="no" ?>
<!DOCTYPE routingtable SYSTEM
"file://///bto/app/mbdb/efc/routerserver/lib/routing-table.dtd">
<routingtable>
<!--CORBA mapping example Using existing a subset (Mode=T) of the NAVTEST3 rules for demo
-->
<!--CORBA mapping example-->
<corbapolicy name="CustomerProfileLocatorByTnV2" contract="NAVTEST3">
<corbamapping iid="A04">
<corbaoffer servicename="customerDemoAL"/>
<corbaoffer servicename="customerDemoGA"/>
</corbamapping>
```

```
<corbamapping iid="A5E">
<corbaoffer servicename="customerDemoAL"/>
<corbaoffer servicename="customerDemoGA" staleness.afteruses="10" staleness.afterminutes="60" staleness.aftererror="false"/>
</corbamapping>
<corbamapping iid="A8D">
<corbaoffer servicename="customerDemoMS"/>
</corbamapping>
<corbamapping iid="CRN">
<corbaoffer servicename="customerDemoNC"/>
</corbamapping>
<corbamapping iid="SSC">
<corbaoffer servicename="customerDemoSC"/>
</corbamapping>
<corbamapping iid="SSZ">
<corbaoffer servicename="customerDemoFL"/>
</corbamapping>
</corbapolicy>
<!--EJB mapping example-->
<ejbpolicy name="CustomerProfileByTnV1" contract="NAVTEST3">
<ejbmapping iid="A04">
<ejboffer server_url="t3://100.90.30.20:1234" icf="weblogic.jndi.WLInitialContextFactory" jndi_name="EJB/TestBeanA04"/>
<ejboffer server_url="t3://100.90.30.20:1234" icf="weblogic.jndi.WLInitialContextFactory" jndi_name="EJB/TestBeanA5E"/>
</ejbmapping>
<ejbmapping iid="A5E">
<ejboffer server_url="t3://100.90.30.20:1234" icf="weblogic.jndi.WLInitialContextFactory" jndi_name="EJB/TestBeanA5E"/>
<ejboffer server_url="t3://100.90.30.20:1234" icf="weblogic.jndi.WLInitialContextFactory" jndi_name="EJB/TestBeanA04"/>
</ejbmapping>
<ejbmapping iid="A8D">
<ejboffer server_url="t3://100.90.30.20:1234" icf="weblogic.jndi.WLInitialContextFactory" jndi_name="EJB/TestBeanA8D"/>
</ejbmapping>
<ejbmapping iid="CRN">
<ejboffer server_url="t3://100.90.30.20:1234" icf="weblogic.jndi.WLInitialContextFactory" jndi_name="EJB/TestBeanCRN"/>
</ejbmapping>
<ejbmapping iid="SSC">
<ejboffer server_url="t3://100.90.30.20:1234" icf="weblogic.jndi.WLInitialContextFactory" jndi_name="EJB/TestBeanSSC"/>
</ejbmapping>
<ejbmapping iid="SSZ">
<ejboffer server_url="t3://100.90.30.20:1234" icf="weblogic.jndi.WLInitialContextFactory" jndi_name="EJB/TestBeanSSZ"/>
</ejbmapping>
</ejbpolicy>
<!--MQ Series example-->
<clienttoqueuepolicy name="test" contract="NAVTEST3">
<clienttoqueuemapping iid="A04">
<clienttoqueueoffer host_ip="90.100.48.36" port="3000" q_mgr_name="queueManager" channel="channelName" in_q_name="queueName1" max_connections="5"/>
<clienttoqueueoffer host_ip="90.100.48.36" port="3000" q_mgr_name="queueManager" channel="channelName" in_q_name="queueName2" max_connections="5"/>
</clienttoqueuemapping>
</clienttoqueuepolicy>
<queuetoqueuepolicy name="SOCSSENDQueueToQueue" contract="SOCSSEND">
<queuetoqueuemapping iid="A04">
<queuetoqueueoffer queue="queueName1"/>
<queuetoqueueoffer queue="queueName2"/>
<queuetoqueueoffer queue="queueName3"/>
</queuetoqueuemapping>
</queuetoqueuepolicy>
</routingtable>
```

The query method hides the details of the underlying routing mechanism that the routing service provides. The client specifies the input parameters, such as version, mode and key. The client then invokes the query method. The query method searches the routing rules in the local database. The local database provides the identifiers of the target service. For example, the identifiers of the target service may include an InterfaceID, Service, and Transaction. The returned InterfaceID and Service can be used to identify the target service. Transaction indicates an IMS (Information Management System) transaction for IMS targets. The transaction field can also be used to identify the type of the target service. For example:

a transaction of "CHANNEL" may indicate that the concatenated InterfaceID and Service form a channel name (typically for a BusinessWare channel);

a transaction of "QUEUE" may indicate that the concatenated InterfaceID and Service form a queue name (typically for MQSeries);

a transaction of "HOST" may indicate that the concatenated InterfaceID and Service form a hostname, which could be used for multiple purposes by the client, including locating the target host for a CONNECT:Direct file transfer;

a transaction of "ASIS" in the local database may indicate that the routing service should simply return a set of parameters with the properties containing the InterfaceID, Service, and Transaction; and a blank transaction or any other value may indicate that the target is a CORBA interface.

The routing table then provides additional properties of the target service to the identifiers provided by the local database. The query method then returns the output parameters to the client. The output parameters may include a name of the target service and/or a sequence of properties to be used to locate the target service.

The following is pseudo-code logic used within the routing service to illustrate the use of InterfaceID, Service, and Transaction in locating the target service is as follows:

```
// Use policy, version, mode, and key to search the local database (policy,
// version, mode, key); populates InterfaceID, Service, and Transaction
if (lookup=="SIMPLE"){// client sent desiredProperties.name="LOOKUP",
  value="SIMPLE"
  // simply return the IID, Service and Tran from the local database
  offer[0].reference=nil;
  offer[0].properties[0].name="IID";
  offer[0].properties[0].value=InterfaceID;
  offer[0].properties[1].name="SERVICE";
  offer[0].properties[1].value=Service;
  offer[0].properties[2].name="TRAN";
  offer[0].properties[2].value=Transaction;
  return;
}
switch (Transaction) // Transaction returned from the local database search
  case "QUEUE":
    offer[0].reference=nil;
    offer[0].properties[0].name="QUEUE";
    offer[0].properties[0].value=InterfaceID||Service;
  case "CHANNEL":
    offer[0].reference=nil;
    offer[0].properties[0].name="CHANNEL";
    offer[0].properties[0].value=InterfaceID||Service;
  case "HOST":
    offer[0].reference=nil;
    offer[0].properties[0].name="HOST";
    offer[0].properties[0].value=InterfaceID||Service;
  default:
    if (transaction not spaces)
      if (interface=="IMSRAW")
        offer[0].reference=NS.resolve
          ("RAW"||InterfaceID);
        offer[0].properties[0].name="TRAN";
        offer[0].properties[0].value=Transaction;
      else
        // The transaction is populated but not used. The MappingGateway in the
        // OrbixIMS Adapter will map the interface and method to the
        // transaction which will be executed.
        obj=NS.resolve("ORX"||InterfaceID);
        mapgw=MappingGateway::_narrow(obj);
        offer[0].reference=mapgw.resolve(interface);
        offer[0].properties
          [0].name="CORBASERVICENAME";
        offer[0].properties[0].value=InterfaceID||Service;
    else
      // If the transaction is not populated, the concatenation of IID and Service will
      // be used to locate the Name Service registration.
      offer[0].reference=NS.resolve(InterfaceID||Service);
      offer[0].properties
        [0].name="CORBASERVICENAME";
      offer[0].properties[0].value=InterfaceID||Service;
```

Following are examples of client code that can be used to use the routing service to locate the various servers.

Locating a CORBA Server

As an example, a CORBA service supports a Customer interface, with methods such as getAccount, getSubscription and updateBillingAddress. Customer records are horizontally distributed in multiple instances of the same server application. The client can uses the routing service to locate the instance of Customer interface that handles the specific telephone number, for example, 123-456-7890. An exemplary client code is as follows.

```
Object_ptr obj;
Router_ptr Rtr;
Customer_ptr Cust;
Account_ptr Acct;
string policy;
Router::PropertySeq desired;
Router::OfferSeq* offers;
obj=NS.lookup("Router");
Rtr=Router.narrow(obj);
policy="CUSTACCT";
desired.length(4);
desired[0].name="VERSION";
desired[0].value="0018";
desired[1].name="MODE";
desired[1].value="P";
desired[2].name="KEY";
desired[2].value="123456";
desired[3].name="INTERFACE";
desired[3].value="Customer";
Rtr.query(policy, desiredProperties, offers);
Cust=Customer::_narrow(*offers[0].reference);
Acct Cust.getAccount("1234567890");
```

In this case, the Customer interface returned is for the instance of the Customer server that handles the 123-456 accounts.

Locating Other Targets

The client can use the routing service to locate any target server by name. The client supplies a policy, version, mode and key and receives a sequence of offers in return from the routing service. Using the properties of the offer, the client can assign any meaning desired. For example, the properties of the offer can be used to build an MQSeries queue name, a BusinessWare channel name, or a destination host name for a file transfer. An exemplary code for returning properties of the offer that can be used to build an MQSeries queue name is as follows:

```
Object_ptr obj;
Router_ptr Rtr;
string policy;
Router::PropertySeq desired;
Router::OfferSeq* offers;
obj=NS.lookup("Router");
Rtr=Router.narrow(obj);
policy="CUSTACCT";
desired.length(4);
desired[0].name="VERSION";
desired[0].value="0018";
desired[1].name="MODE";
desired[1].value="P";
desired[2].name="KEY";
desired[2].value="123456";
desired[3].name="TRANSPORT";
desired[3].value="QUEUE";
Rtr.query(policy, desired, offers);
// offers[0].properties[0].name="QUEUE"
// offers[0].properties[0].value="CRIS.ALABAMA"
targetQ.ObjectName=offers[0].properties[0].value;
MQOPEN(Hcon, targetQ, options, &Htarget, &OpenCode, &Reason);
MQPUT(Hcon, Htarget, &targetQ_md, options, msglen, message, &CompCode, &Reason);
```

In this case, the routing service returns an offer containing information needed to identify the queue name of the target server.

Locating OrbixIMS Adapter IMSraw Interface

The routing service can be used to locate a OrbixIMS adapter IMSraw interface. The IMSraw interface is built into the OrbixIMS adapter and allows CORBA client programs to execute IMS transactions without modifying the transaction. IMSraw interface offers an operation "run_transaction" for invoking legacy transactions. Using the IMSraw interface, a CORBA wrapper can be written to present an object-oriented interface and run on either a UNIX or an OS/390 platform. The CORBA wrapper implementation can use the IMSraw interface to access existing IMS legacy functionality. The client can use the routing service to lookup the appropriate IMS Adapter IMSraw interface. An exemplary code for locating the IMSraw interface is as follows:

```
Object_ptr obj;
Router_ptr Rtr;
string policy;
Router::PropertySeq desired;
Router::OfferSeq* offers;
imsraw_ptr IMSBridge;
obj=NS.lookup("Router");
Rtr=Router.narrow(obj);
policy="CUSTACCT";
desired.length(4);
desired[0].name="VERSION";
desired[0].value="0018";
desired[1].name="MODE";
desired[1].value="P";
desired[2].name="KEY";
desired[2].value="123456";
desired[3].name="INTERFACE";
desired[3].value="IMSRAW";
obj=Rtr.query(policy, desired, offers);
IMSBridge=imsraw::_narrow(*offers[0].reference);
out=IMSBridge.run_transaction(*offers[0].properties[0].value, "ACCTNUM==~1234567890~;");
```

Figure 4:
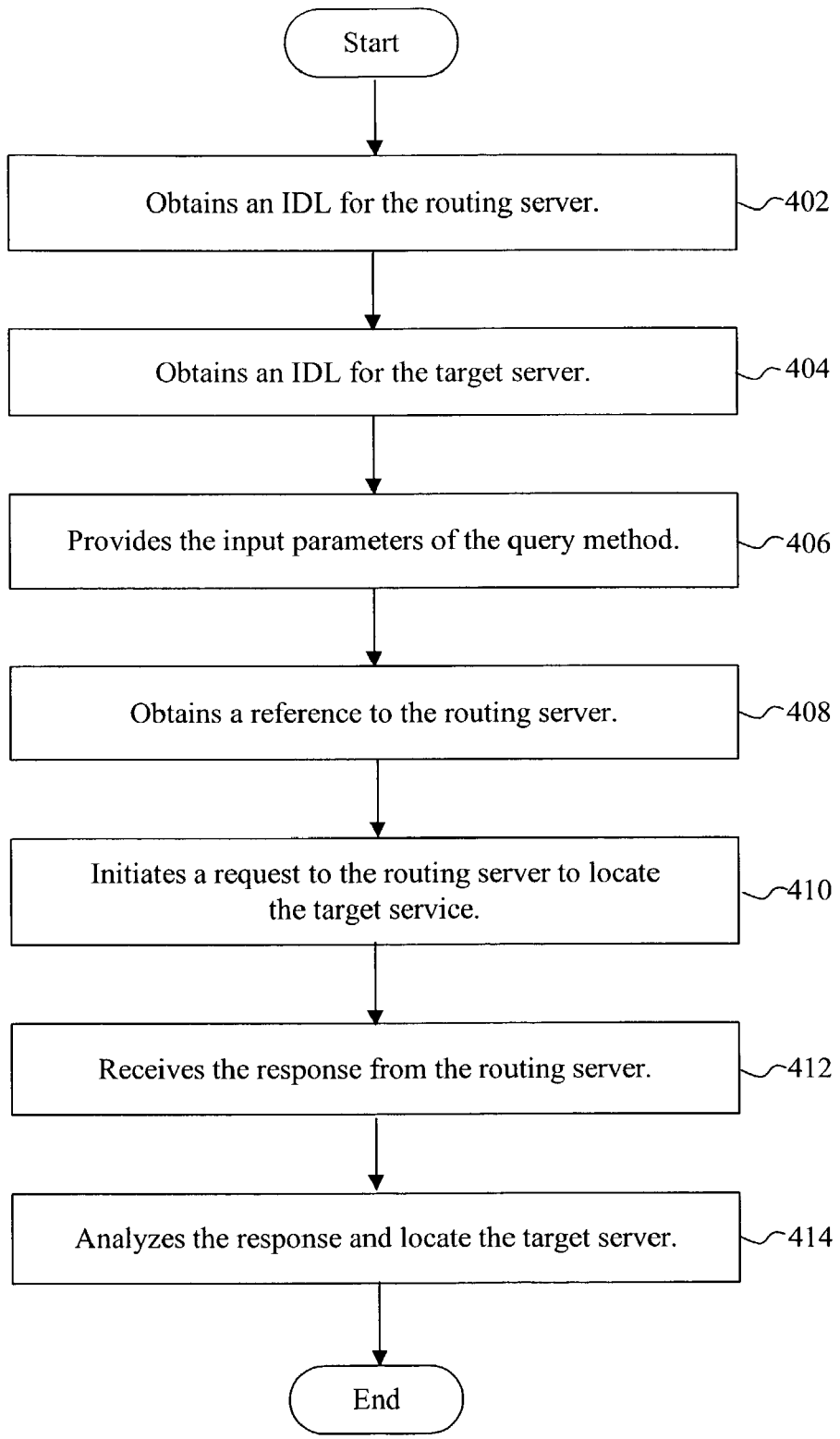
FIG. 4 is a flow diagram showing exemplary steps that may be used to locate a target service in distributed computing environment according to a preferred embodiment of the present invention.

FIG. 4 shows a flow diagram illustrating exemplary steps that can be used to locate a target service using the routing service of present the invention.

In step 402, an IDL for the routing service is obtained. The IDL is then compiled on the client to obtain a first stub. The first stub is integrated with the client code. The client will use the first stub to communicate with the routing server.

In step 404, an IDL for the target service interface is obtained. This IDL is then compiled on the client to obtain a second stub. The client will use the second stub to communicate with the server of the target service.

In step 406, the input parameters of the query method of the routing service are provided in the client code. This can be achieved by providing a desired value for input attributes of the query method. The input attributes of the query method are described in detail above. For one of the input attributes, desiredProperties, for example, mode can be set as 'mode=T' and interfacename can be set as CORBA, EJB, IMSraw, or Client_to_Queue, according to the type of the target service. The routing service can extract the key out of the input data and use it to locate the target server. For example, for input data, 1234567890, the router can extract the key, 123456, and use it to route the request.

In step 408, a reference to the routing server is obtained. Remote CORBA services (either remote routing service, or other remote CORBA services) or the client's local CORBA name service can be used to obtain the reference to the routing service. Preferably, the client's local CORBA name service is used. Lookup method can be used to obtain the reference to the routing server.

In step 410, the client initiates a request to the routing service to locate the target server. The client calls the query method of the routing service. The client communicates with the routing server through the first stub obtained in step 402. The followings are examples of the code that can be used for various services:

```
for CORBA service:
    public myClass
    {
    public void init( )
    {
      . . .
       // init the ORB etc.
      . . .
    }
    // other logic
    public void getService( )
    {
    try
      {
        Property [ ] desiredProperties=new Property [5];
        OfferSeqHolder offerSeqHolder=new OfferSeqHolder( );
        Offer [ ]offers;
```

```
        String policy="CORBAPolicy";
        desiredProperties[0]=new Property("MODE","T");
    desiredProperties[1]=new    Property("VERSION",
"0001");
    desiredProperties[2]=new         Property("KEY",
"1234567890");
    // Set interface to CORBA
    desiredProperties[3]=new    Property("INTERFACE",
"CORBA");
    // Look up the router providing the routing service in the
local naming service
    localNS=ORB.resolve_initial_references("NamingService");
    router=localNS.lookup("Router");
    routerProxy=narrow(orb.string_to_object(router));
    // Call query method on the routerProxy object
    routerProxy.query(policy,desiredProperties,offerSeqHolder);
    offers=offerSeqHolder.value;
    if(offers !=null && offers[0].properties !=null)
    {
    // for each offer, list results
    for (int i=0; i<offers.length; i++)
    {
    if ( . . . )
    // put logic to check other properties to select an offer
    {
    java.util.Properties properties=
    RouterUtil.toProperties(offers[i].properties);
    String svc=properties.get("SERVICE NAME");
    System.out.println("Offer["+i+"]");
    System.out.println("SERVICE NAME=["+svc+"]");
    }
    }
    Object svcObj=narrow(orb.string_to_object(svc));
    // use the svcObj object
    // e.g. String output=svcObj.execute(input);
    }
    catch(Exception e)
    {
    System.err.println(e.getMessage( ));
    }
    }
    }
    for EJB service:
    public myClass
    {
    public void init( )
    {
    . . .
    // init the ORB etc.
    . . .
    }
    // other logic
    public void getService( )
    {
    try
    {
    Property [ ] desiredProperties=new Property [5];
    OfferSeqHolder offerSeqHolder=new OfferSeqHolder( );
    Offer [ ]offers;
    String policy="EJBPolicy";
    desiredProperties[0]=new Property("MODE","T");
    desiredProperties[1]=new    Property("VERSION",
        "0001");
    desiredProperties[2]=new         Property("KEY",
        "1234567890");

// Set interface to EJB
    desiredProperties[3]=new    Property("INTERFACE",
        "EJB");
    // Look up the router in the local naming service
    localNS=ORB.resolve_initial_references("NamingService");
    router=localNS.lookup("Router");
    routerProxy=narrow(orb.string_to_object(router));
    // Call query method on the routerProxy object
    routerProxy.query(policy,desiredProperties,offerSeqHolder);
    offers=offerSeqHolder.value;
    if(offers !=null && offers[0].properties !=null)
    {
    // for each offer, list results
    for (int i=0; i<offers.length; i++)
    {
    if ( . . . )
    // put logic to check other properties to select an offer
    {
    java.util.Properties properties=
    RouterUtil.toProperties(offers[i].properties);
    System.out.println("Offer["+i+"]");
    String svc=properties.get("SERVER_URL");
    System.out.println("SERVER URL=["+svc+"]"):
    String icf=properties.get("ICF");
    System.out.println("INITIAL CONTEXT FACTORY=
        ["icf+"]");
    String jndi=properties.get("JNDI_NAME");
    System.out.println("JNDI NAME=["+jndi+"]");
    // use these properties to lookup the EJB
    }
    }
    }
    catch(Exception e)
    {
    System.err.println(e.getMessage( ));
    }
    }
    for MQ Series service (QUEUE_TO_QUEUE):
    public myClass
    {
    public void init( )
    {
    . . .
    // init the ORB etc.
    . . .
    }
    // other logic
    public void getService( )
    {
    try
    {
    Property [ ] desiredProperties=new Property [5];
    OfferSeqHolder offerSeqHolder=new OfferSeqHolder( );
    Offer [ ]offers;
    String policy="ClientToQueue";
    desiredProperties[0]=new Property("MODE","T");
    desiredProperties[1]=new    Property("VERSION",
        "0001");
    desiredProperties[2]=new         Property("KEY",
        "1234567890");
    // Set interface to QUEUE_TO_QUEUE
    desiredProperties[3]=new
    Property("INTERFACE","QUEUE_TO_QUEUE");
    // Look up the router in the local naming service
```

```
localNS=ORB.resolve_initial_references("NamingSer-
   vice");
router=localNS.lookup("Router");
routerProxy=narrow(orb.string_to_object(router));
// Call query method on the routerProxy object
routerProxy.query(policy,desiredProperties,offerSe-
   qHolder);
offers=offerSeqHolder.value;
if(offers !=null && offers[0].properties !=null)
{
// for each offer, list results
for (int i=0; i<offers.length; i++)
{
if ( ... )
// put logic to check other properties to select an offer
{
java.util.Properties properties=
RouterUtil.toProperties(offers[i].properties);
String queue=(String) properties.get("QUEUE");
System.out.println("Offer["+i+"]");
System.out.println("QUEUE=["+queue+"]");
//Create a Queue object and put or get your message.
}
}
}
catch(Exception e)
{
System.err.println(e.getMessage( ));
}
}
}
for MQSeries (CLIENT_TO_QUEUE):
public myClass
{
public void init( )
{
...
// init the ORB etc.
...
}
// other logic
public void getService( )
{
try
{
Property [ ] desiredProperties=new Property [5];
OfferSeqHolder offerSeqHolder=new OfferSeqHolder( );
Offer [ ]offers;
String policy="ClientToQueue";
desiredProperties[0]=new Property("MODE","T");
desiredProperties[1]=new       Property("VERSION",
   "0001");
desiredProperties[2]=new             Property("KEY",
   "2059771231");
// Set interface to CLIENT_TO_QUEUE
desiredProperties[3]=new
Property("INTERFACE","CLIENT_TO_QUEUE");
// Look up the router in the local naming service
localNS=ORB.resolve_initial_references("NamingSer-
   vice");
router=localNS.lookup("Router");
routerProxy=narrow(orb.string_to_object(router));
// Call query method on the routerProxy object
routerProxy.query(policy,desiredProperties,offerSe-
   qHolder);
offers=offerSeqHolder.value;
if(offers !=null && offers[0].properties !=null)
{
// for each offer, list results
for (int i=0; i<offers.length; i++)
{
if ( ... )
// put logic to check other properties to select an offer
{
java.util.Properties properties=
RouterUtil.toProperties(offers[i].properties);
String ip=(String) properties.get("HOST_IP");
System.out.println("Offer["+i+"]");
System.out.println("HOST_IP=["+ip+"]");
//Get a reference to the queue manager from host, port and
   //channel.
//From the queue manager get reference to the queue.
//Put or get your message.
}
}
}
catch(Exception e)
{
System.err.println(e.getMessage( ));
}
}
}
for IMS Mapping Gateway:
// Description:
// IDL definition of a 2-D grid (in row major order)
//
interface grid {
   readonly attribute short height; // height of the grid
   readonly attribute short width; // width of the grid
   // IDL operations
   // set the element [n,m] of the grid, to value:
   void set (in short n, in short m, in long value);
   // return element [n,m] of the grid:
   long get (in short n, in short m);
};
An example of the client application for using the router
server to locate a CORBA object on an IMS and using the
Grid object is as follows:
*/
class IMSMappingGatewaySample {
Router routerProxy; // reference to Router object
org.omg.CORBA.ORB orb;
/**
/* create an IMSMappingGatewaySample,
* @param args passed to ORB.init
*/
IMSMappingGatewaySample(String    args[  ])    throws
   Exception {
org.omg.CORBA.Object objref=null;
org.omg.CosNaming.NamingContextExt rootContext;
//
// Initialize the ORB
//
System.out.println("Starting . . . ");
orb=ORB.init(args,null);
System.out.println("A"+orb.getClass(   )+"Instance    of
   ORB has been created.");
//
// Get a reference to Naming Service
//
objref=orb.resolve_initial_references("NameService");
rootContext=NamingContextExtHelper.narrow(objref);
//
// Now lookup the Router in the CORBA Name Service
```

```
//
if ((objref=rootContext.resolve_str("Router"))==null) {
System.out.println("Failed to resolve Router to object ref
    !!");
System.exit(0);
} else {
routerProxy=RouterHelper.narrow(objref);
}
}
public void execute( ) {
try {
Property [ ] desiredProperties=new Property [3];
OfferSeqHolder offerSeqHolder=new OfferSeqHolder( );
Offer [ ]offers;
//
// the request is routed to the IMSMapping gateway adapter
    in the A04 region
//
// The interface property identifies the name of the target
    object. This is the name of // the object as registered on
    IMS.
String policy="NAVTEST3";
desiredProperties[0]=new Property("MODE","T");
desiredProperties[1]=new Property("DATA","A04");
desiredProperties[2]=new      Property("INTERFACE",
    "grid");
//
// query the router
//
routerProxy.query(policy,desiredProperties,offerSe-
    qHolder);
//
// offers are the result set returned by the router
//
offers=offerSeqHolder.value;
if (offers !=null && offers[0].properties !=null) {
// for each offer list results
for (int i=0; i<offers.length; i++) {
java.util.Properties properties=
RouterUtil.toProperties(offers[i].properties);
String transaction=(String) properties.get("TRAN");
System.out.println("Offer["+i+"]");
System.out.println("TRAN=["+transaction+"]");
//
// to locate the Grid interface
//
grid gridProxy=gridHelper.narrow(offers[i].reference);
// Use the Grid object in the same way as any other CORBA
    object by calling
// methods on it.
System.out.println("IMS    Grid    height="+gridProxy-
    .height( ));
System.out.println("IMS Grid width="+gridProxy.width(
    ));
gridProxy.set((short)50,(short)50,51);
System.out.println("Value at IMS Grid(50,50)="
+gridProxy.get((short)50,(short)50));
}
} else {
System.out.println("Error no offers were returned");
}
} catch (NotFoundException e) {
System.out.println("Exception"+e.reason);
} catch (Exception e) {
System.out.println("Exception"+e.getMessage( ));
e.printStackTrace( );
}
}
public static void main(String args[ ]) throws Exception {
IMSMappingGatewaySample sample=new IMSMapping-
    GatewaySample(args);
sample.execute( );
}
```

In step 412, the routing service returns a set of output parameters containing the identifiers of the target server to the client. The returned set of parameters contains either a service name, queue name and/or other applicable information depending on the service requested. For example, CORBA interface returns a sequence of offers containing a service name to the CORBA service; EJB interface type returns a sequence of offers containing a server URL (Universal Resource Location), an initial context factory and a JNDI (Java Naming and Directory Interface) name; CLIENT_TO_QUEUE interface returns a sequence of offers containing HOST_IP, PORT, Q_MGR_NAME, CHANNEL, IN_Q_NAME, and MAX_CONECTIONS; and QUEUE_TO_QUEUE interface returns a sequence of offers containing QUEUE and TRANCODE.

In step 414, the client analyzes the response returned and locates the target server. For CORBA service, the client looks up the name returned by the query method in the client's local naming service to obtain an object reference containing an identification of the target server so that an object adapter of the CORBA can pass a client's request to the target server. For other services, like MQSeries, IMSraw and EJB, the client uses the set of parameters returned to locate the target server. The client can now send a request to the target service.

The routing service of the present invention can be seamlessly integrated into existing CORBA domains. Thus, there is no need for the application to create and administer a new additional domain solely for the use of the routing services. The routing service can be run simultaneously in multiple instances, providing high availability and load-balancing characteristics to distributed computing environment. Since the routing service of the present invention is provided as a CORBA service, the routing service enables access to the service from many platforms and languages, thus providing a flexibility. Further, by using the local database to make routing decisions, the routing service of the present invention provides a fast routing.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for providing a routing service that enables a client to locate a target service in a distributed computing environment supporting multiple communications protocols, comprising:
    a main database having routing information; and
    a routing device including
        a local database that has an extract of the main database and an identifier of the target service, wherein the routing device uses the local database to locate the identifier of the target service, and
        a routing table, wherein the routing device uses the identifier from the local database to look up additional properties in the routing table to add to the identifier of the target service for locating the target service.

2. The system of claim 1, wherein the routing device is distributed in a plurality of instances.

3. The system of claim 2, wherein the plurality of instances of the routing device are running simultaneously.

4. The system of claim 1, wherein the routing device further includes a code defined in Interface Definition Language (IDL), wherein the code receives input parameters including property name and value of the target service and returns output parameters containing location information of the target service, wherein the output parameters include one of a queue name and a channel name.

5. The system of claim 4, wherein the input parameters include a type of the target service.

6. The system of claim 5, wherein the type of the target service includes a distributed object system.

7. The system of claim 4, wherein the output parameters include a reference of the target service and associated properties.

8. The system of claim 4, wherein the output parameters includes a logical name of a distributed object system service.

9. The system of claim 8, wherein the logical name is used to obtain an object reference of the distributed object system service.

10. The system of claim 4, wherein the location information includes a server Universal Resource Locator (URL) or a Java Naming and Directory Interface name.

11. A method for a client to locate a target service using a routing mechanism that enables distributed applications to locate distributed service provider applications in distributed computing environment supporting multiple communications protocols comprising the steps of:
    providing content based input parameters from the client;
    obtaining a reference to the routing mechanism by the client, wherein the routing mechanism includes an extract of a main database having routing information and an identifier of the target service;
    sending a request to the routing mechanism from the client including at least a content based routing key, wherein the key is utilized in mapping to the target service and wherein the routing mechanism is co-located with the client;
    receiving output parameters from the routing mechanism by the client;
    analyzing the output parameters by the client to obtain one or more references to the target service; and
    locating the target service by the client.

12. The method of claim 11, wherein the method further comprises the step of compiling a first IDL for the routing mechanism and a second IDL for the target service on the client.

13. The method of claim 11, wherein the reference to the routing mechanism is obtained from a distributed object system name service.

14. The method of claim 11, wherein the input parameters include a type and property name and value pair of the target service.

15. The method of claim 14, wherein the type of the target service includes a distributed object system.

16. The method of claim 11, wherein the routing mechanism is distributed in a plurality of instances.

17. The method of claim 16, wherein the plurality of instances of the routing mechanism are running simultaneously.

18. The method of claim 11, wherein the output parameters include a name for a distributed object system service and a logical name for a distributed object system service.

19. The method of claim 18, wherein the method further includes obtaining an object reference to the target service with the logical name using a distributed object system name service.

20. The method of claim 11, wherein the routing mechanism includes a database including routing information.

21. The method of claim 20, wherein the routing mechanism uses the routing information in the database to make a routing decision.

22. The method of claim 20, wherein the database provides identifiers of the target service.

23. The method of claim 22, wherein the routing mechanism further includes a routing table receiving the identifiers from the database and providing additional properties of the target service.

24. The method of claim 23, wherein the routing table is in XML format.

25. The method of claim 11, wherein the routing mechanism further includes a code defined in IDL for receiving the input parameters.

26. A system for providing a routing service in distributed computing environment supporting multiple communications protocols, comprising:
    a main database including routing information; and
    a device for providing the routing service, distributed in a plurality of instances, wherein the includes a local database storing an extract of the main database and providing identifiers of a target service, a code providing input parameters for searching the local database wherein the input parameters comprise at least a telephone number and wherein the code receives a property name and value of the target service and returns output parameters containing location information of the target service, wherein the output parameters include one of a queue name and a channel name, and a routing table for receiving the identifiers of the target service from the local database and providing additional properties of the target service, wherein the device enables distributed applications to locate distributed service provider applications.

27. A routing server in a distributed computing environment supporting multiple communications protocols, comprising:
    a local database, wherein the local database includes routing rules and provides at least one identifier for a target service and;
    a routing table, wherein the routing server receives input parameters from a client specifying a desired target service, wherein the routing server is co-located with the client and wherein further the routing server uses the identifier from the local database to look up additional properties in the routing table to add to the identifier of the target service for locating the target service.

28. The system of claim 27, wherein the routing information is extracted from a main database.

29. The system of claim 27, wherein the routing server further includes a code defined in IDL.

* * * * *